United States Patent [19]

Shimada et al.

[11] 4,362,268
[45] Dec. 7, 1982

[54] AIR CONDITIONING SYSTEM FOR AN AUTOMOTIVE VEHICLE COMPARTMENT

[75] Inventors: Yukio Shimada; Naoyoshi Suzuki; Toshio Ohashi, all of Yokohama; Yasushi Inoshita, Tokyo, all of Japan

[73] Assignee: Nissan Motor Company, Limited, Yokohama, Japan

[21] Appl. No.: 197,678

[22] Filed: Oct. 16, 1980

[30] Foreign Application Priority Data

Oct. 24, 1979 [JP] Japan .................. 54-136450

[51] Int. Cl.³ ............................................. G05D 23/13
[52] U.S. Cl. ....................................... 236/13; 165/43; 236/84
[58] Field of Search ............... 165/43, 24; 236/13, 236/84; 98/2.08; 137/867, 868

[56] References Cited

U.S. PATENT DOCUMENTS

| 2,966,032 | 12/1960 | Weymouth | 60/97 |
|---|---|---|---|
| 3,404,835 | 10/1968 | Rodgers | 236/13 |
| 3,406,904 | 10/1968 | Muzzi et al. | 236/13 X |
| 3,428,115 | 2/1969 | Caldwell | 236/13 X |
| 3,455,505 | 7/1969 | Beatenbough et al. | 236/13 X |
| 3,718,281 | 2/1973 | Beatenbough et al. | 236/13 X |
| 3,731,729 | 5/1973 | Beatenbough et al. | 165/16 |
| 3,761,017 | 9/1973 | Mohri | 236/87 |
| 3,774,676 | 11/1973 | Franz | 165/23 |
| 4,134,542 | 1/1979 | Sugiura | 236/87 X |
| 4,262,738 | 4/1981 | Kato et al. | 236/84 X |

FOREIGN PATENT DOCUMENTS

| 2203895 | 8/1973 | Fed. Rep. of Germany . |
| 2403316 | 8/1975 | Fed. Rep. of Germany . |
| 2057424 | 5/1971 | France . |
| 2178649 | 11/1973 | France . |
| 2332501 | 6/1977 | France . |

Primary Examiner—William E. Tapolcai
Attorney, Agent, or Firm—Lane, Aitken, Kice & Kananen

[57] ABSTRACT

An air conditioning system particularly mounted in a passenger compartment of an automotive vehicle according to the present invention can be fixed in the maximum heating operation mode to produce a maximum effect of the defrosting function by only pushing a push-button switch engaged with a mode selector for maximizing the air blowing rate of a ventilating fan and also engaged with a three-way vacuum switch for opening a vacuum power servomechanism to the air to fix an air mix door in the maximum heating position.

11 Claims, 6 Drawing Figures

FIG. I (PRIOR ART)
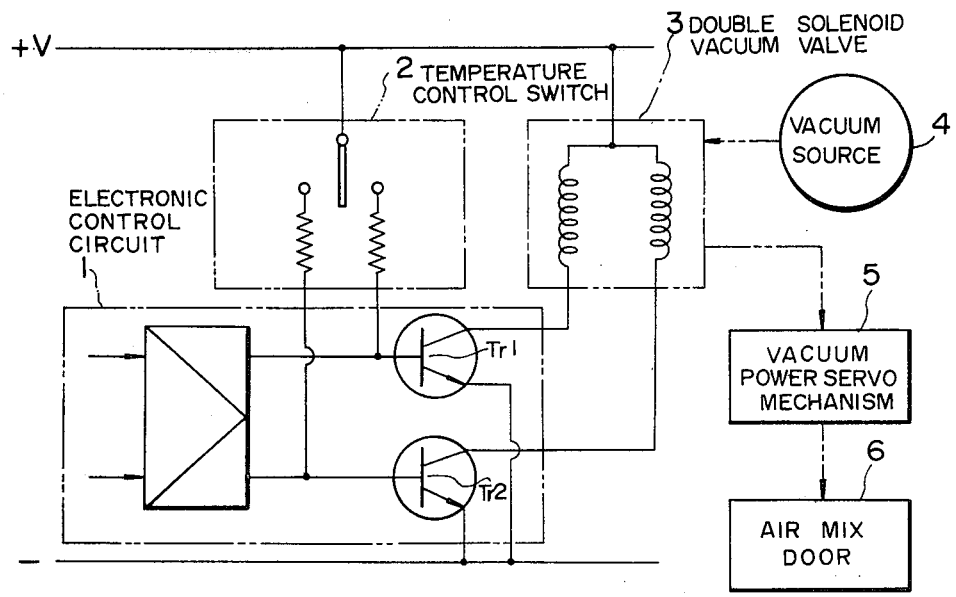
FIG. 2
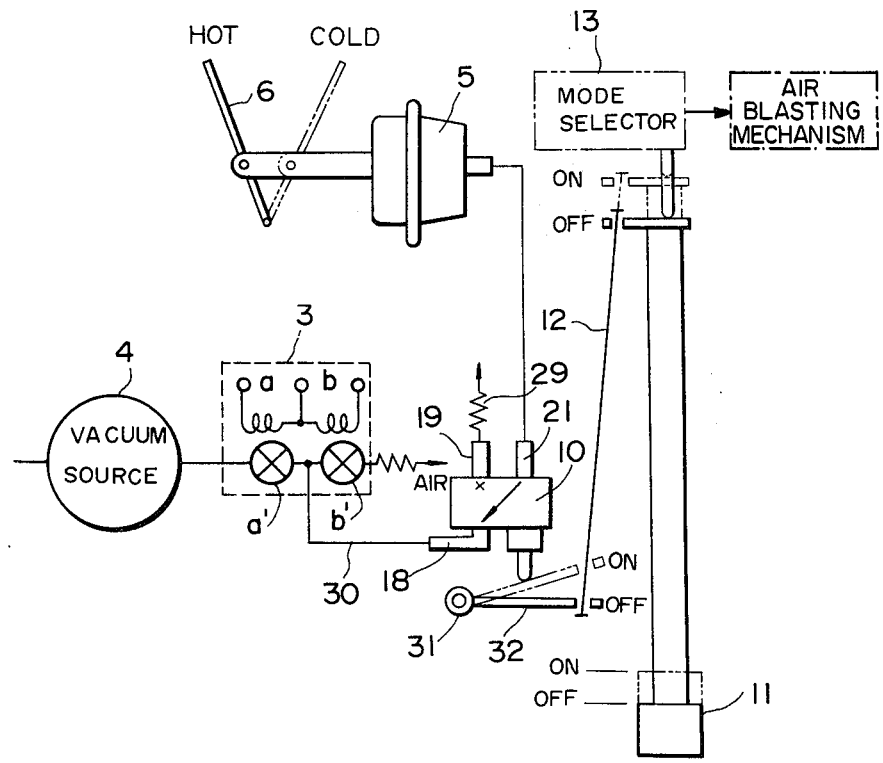

AIR CONDITIONING SYSTEM FOR AN AUTOMOTIVE VEHICLE COMPARTMENT

BACKGROUND OF THE INVENTION (1) Field of the Invention

The present invention relates generally to an air conditioning system mounted in an automotive vehicle compartment, and more specifically to an air conditioning system particularly mounted in an automotive vehicle which performs fixing control over the swing position of an air mix door irrespective of control operation by an automatic temperature control means, particularly when a maximum compartment temperature of the vehicle is required, for example, in a case when urgent defrosting is needed.

(2) Description of the Prior Art

An air conditioning system for a vehicle compartment has been proposed which performs automatic temperature control over the compartment temperature. In a warm air blow-out mode such as a defrosting operation, the air conditioning system fixes the air mix door at a full position for the air to flow through a heating means such as a heater core to maintain the temperature of the warm air blown out into the compartment through a ventilator, i.e., a defroster nozzle facing toward a windshield of the vehicle at the highest possible temperature so that the maximum defrosting effect can be achieved. In a conventional air conditioning system, there is provided a temperature-control switch for generating an electrical signal at the front output stage of an electronic control circuit to fix the air conditioning system in the maximum heating or cooling operation mode. The temperature-control switch is located within the electronic control circuit in parallel with a voltage comparator (temperature detecting circuit) and actuates either of a pair of transistors in the last output stage of the electronic control circuit depending on an actuating signal of a different power line from that of the voltage comparator and furthermore actuates a double solenoid vacuum valve connected to both transistors so that the maximum controlled vacuum output is generated.

In the defrost mode, or in a mode requiring the maximum capability of the air conditioning system, the double solenoid vacuum valve forces a vacuum power servomechanism to displace and fix the air mix door up to a maximum stroke position.

As in the case of the above-described prior art, when a lever or push button is operated to select the defrosting mode, an electric circuit for connecting a fixed resistor to such a temperature detecting circuit and a circuit for switching the resistor in defrosting mode are required, so that the whole circuit may become complicated.

When an electronic circuit in the air conditioning system fails, an emergency circuit is required which maintains, irrespective of a temperature control circuit, the basic function of the air conditioning system such as cooling and heating capacity.

In making up such an emergency circuit, conventionally a temperature-control switch is incorporated to perform fixing control of maximum cooling or maximum heating irrespective of an automatic temperature adjusting electronic circuit. In this case, an additional electric circuit and switch are required, so that the whole circuit may become complicated.

Such a conventional air conditioning system has a disadvantage that when the electronic circuit fails, the circuit as described above cannot serve as the emergency circuit for a failure of the subsequent stage of the automatic temperature adjusting electronic circuit.

Among other things, a conventional air conditioning system is designed to perform two operations, of defrost mode selection through a mode selector and of fixing a temperature setting lever into a maximum temperature range for performing a defrost operation in a short period of time, independently of each other, so that an operator must carry out an urgent defrost operation through a twice complicated operations.

SUMMARY OF THE INVENTION

With the above problems in mind, it is a primary object to provide an air conditioning system for an automotive vehicle compartment which can fix a temperature set mechanism including an air mix door in the maximum heating condition by pushing the defrost mode selection switch to an ON position so that the urgent defrosting of blasting a high temperature air is made possible in a short time.

It is another object of the present invention to provide an air conditioning system for an automotive vehicle compartment incorporating an emergency vacuum circuit, operable when trouble occurs and capable of operating independently of an electrical control circuit, which is provided with a defrost mode selecting means mechanically connected to a mode selector for maximizing the air blowing rate of a fan and to a means for fixing the emergency vacuum circuit in the maximum heating condition so that the maximum air temperature fixing operation and the defrosting operation can be performed independently of each other.

To achieve the above-described objects, a vacuum power servomechanism for angularly moving an air mix door (used for the temperature setting of the air blowing) is designed to perform switching to the maximum heating mode together with the operation of defrost-mode switch.

Furthermore, since the emergency vacuum circuit can fix the vacuum power servomechanism in the maximum cooling and heating operation mode, the defrost setting in the maximum heating mode can be performed by using a maximum heating fixing means in the emergency vacuum circuit, so that the construction of the air conditioning system may be simplified.

BRIEF DESCRIPTION OF THE DRAWINGS

The air conditioning system according to the present invention will be better appreciated from the following description taken in conjunction with the accompanying drawings in which like reference numerals designate corresponding elements, and in which:

FIG. 1 is a block diagram of a part of a temperature controlling means in a conventional air conditioning system;

FIG. 2 is a circuit diagram of a first preferred embodiment according to the present invention;

DESCRIPTION OF THE PREFERRED EMBODIMENTS

Figure 3:
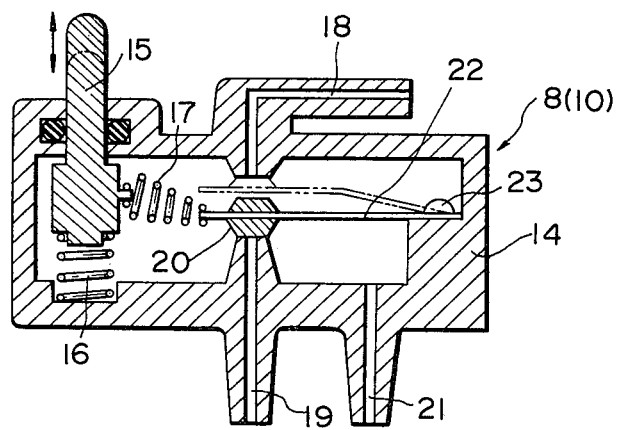
FIG. 3 is a cross sectional view of a three-way vacuum switch used in the preferred embodiments.

Reference will be made to the drawings, and first to FIG. 1 which shows a block diagram of an air conditioning system having automatic temperature adjusting means including a conventional means for fixing the air conditioning system in the maximum cooling or heating operation mode.

In FIG. 1, numeral 1 denotes an electronic control circuit which controls the air temperature blown from the air conditioning system and reference numeral 2 denotes a temperature-control switch for fixedly heating or cooling the air blown from the air conditioning system at a maximum limit by feeding a current from another power line into either of the transistors $Tr_1$ and $Tr_2$ for saturating one or the other depending on the position of the temperature-control switch 2.

The temperature-control switch 2 is located near the electronic control circuit 1 in parallel with a voltage comparator which outputs an automatic control signal. When the temperature-control switch 2 is operated to saturate either of the transistors $Tr_1$ and $Tr_2$, a double solenoid vacuum valve 3 (abbreviated as D.S.V.V.) connected to both transistors $Tr_1$ and $Tr_2$ is actuated to generate a corresponding maximum vacuum control output.

Thus, in the defrost mode or in other modes to produce maximum capabilities of the air conditioning system, the use of the double solenoid vacuum valve enables a power vacuum servomechamism to move to and be fixed in its maximum stroke position.

As apparent from the description above, when the defrost mode is selected by operating a set lever or push-button switch constituting the movable contact and the three fixed contacts, fixed resistors to be connected to such a temperature adjustment electronic circuit control and a switch for connectively switching one of the fixed resistors to such a temperature adjustment circuit will be required, so that the whole circuit may become complicated.

On the other hand, an emergency air temperature fixing means will be required in an ordinary vehicle compartment air conditioning system which maintains cooling or heating abilities, the basic functions an air conditioning system has, irrespective of its temperature controlling ability, even though an electronic circuit within an air conditioning system fails. In forming such an emergency temperature fixing means, the temperature-control switch 2 is used for fully saturating either of the transistors $Tr_1$ and $Tr_2$ so as to fix the double solenoid valve 3 in the maximum cooling or heating operation mode, regardless of the automatic temperature controlling electronic circuit 1. In this case, an additional electric circuit and switch are required, so that the whole circuit will be more complicated. Furthermore, the temperature-control switch 2 is useless for a failure in a subsequent stage of the automatic temperature controlling electronic circuit 1, such as transistors $Tr_1$ and $Tr_2$.

Among other things, since in conventional vehicle compartment air conditioning systems a defrost mode selection by means of a mode selection mechanism and maximum temperature fixing by means of a temperature setting lever to perform a defrost operation in a short time are performed independently of each other, the conventional air conditioning system requires an operator to perform two separate operations. Such a procedure is very inconvenient, especially when rapid defrost is urgently needed by the occupant of the vehicle.

With reference to FIG. 2, a first preferred embodiment of the present invention will be described.

In the first preferred embodiment shown in FIG. 2, a vacuum source 4 corresponding to an engine intake manifold (not shown in the drawing) exerts a vacuum action on a vacuum control means such as a double solenoid vacuum valve 3. The double solenoid vacuum valve 3 includes first solenoid 3a and second solenoid 3b, a vacuum supply valve a' for connecting a the vacuum source 4 to a controlled circuit when the first solenoid a is energized, and an air opening valve b' for opening the controlled circuit to the air (atmospheric pressure) when the second solenoid b is energized. Numeral 10 denotes a three-way vacuum switch located between the double solenoid vacuum valve 3 and a control circuit, that is to say, vacuum power servomechanism 5. The three-way vacuum switch 10 is connected to an air opening circuit 29 and via a controlled-vacuum supplying circuit 30 to an intermediate portion between the valves a' and b' of the double solenoid vacuum valve 3, so that the vacuum power servomechanism 5 can be connected to the controlled vacuum supplying circuit 30 or to the air opening circuit 29 depending on the operation of the three-way vacuum switch 10. A blade 32 is located near a top portion of a switching rod of the three-way vacuum switch 10 and is pivotally supported at one end by a pin 31. A proper driving power transmitting means such as a tie-rod 12 for upwardly pushing the blade 32 penetrates the blade 32 in the vicinity of another end for transmitting driving power from a push-button switch 11 for selecting the defrost mode. The defrost mode selection push-button switch 11 is movable from an "OFF" position to an "ON" position as shown in FIG. 2. At its top portion one end of the tie-rod 12 is engaged with the defrost mode push-button selection switch 11. When the defrost mode selection push-button switch 11 is transferred from the "OFF" position to the "ON" position as shown by phantom lines in FIG. 2, the blade 32 is correspondingly turned upward from an "ON" position to an "OFF" position to depress the switching rod of the three-way vacuum switch 10. On the other hand, the defrost mode selection push-button switch 11 is operatively connected to a mode selector 13 including means such as a vacuum selector, which determines the direction of intake air flow passing through the conventional air conditioning duct depending on, e.g., whether a switch is turned on. In this manner, the air blasting mechanism is conventional in the air conditioning system, and comprises, e.g., an intake air door which determines what intake air is to be admitted into the air conditioning duct, a ventilator door for opening a ventilator duct facing toward, e.g., a front seat of the passenger compartment, a floor duct door for opening a floor duct facing toward the floor of the passenger compartment, and a defroster door for opening a floor duct facing the windshield of the vehicle. An air blasting mechanism can be driven in a defrost state, i.e., opening the defroster door only with the intake air door open to admit the fresh air, by turning the defrost mode selection push-button switch 11 its "ON" position. When the three-way vacuum switch 10 is operated by turning the defrost mode selection switch 11 to "ON" position, the passage shown by an arrow-marked solid line within the three-way vacuum switch 10 in FIG. 2 is interrupted to connect the vacuum power servomechanism 5 to the air opening conduit 29 so that the air conditioning system is switched to the maximum heating condition, i.e., all of the intake air within the air conditioning duct is passed through the heating element according to the full open state of the air mix door 6.

An example of the three-way vacuum switch 10 is shown in FIG. 3, which is its sectional view.

Numeral 14 denotes a housing having three vacuum passages 18, 19 and 21, a push rod 15 whose head portion is projected therefrom and whose bottom portion is supported by a return spring 16, a flat spring 22, and a valve body 20 located on the flat spring 22 for closing either of the vacuum passages 18 and 19. The flat spring 22 is attached fixedly to the housing 14 at its right fixed end by means of a screw 23 and is connected to a snap spring 17 at its left free end. The snap spring 17 is attached to the side portion of the push rod 15 at its other end. In FIG. 3, the snap spring 17 biases the flat spring 22 downward to close the vacuum passage 19. At this time, the vacuum passage 18 is linked to the vacuum passage 21. When the push rod 15 moves toward a lower position shown by an arrow-marked solid line against the return spring 16, the snap spring 17 acts to snap the flat spring 22 upward to close the vacuum passage 18 and to open the vacuum passage 19 so that the vacuum passages 18 and 21 can be connected to each other. Therefore, the switching action of the three-way vacuum switch 10 is performed.

Figure 4:
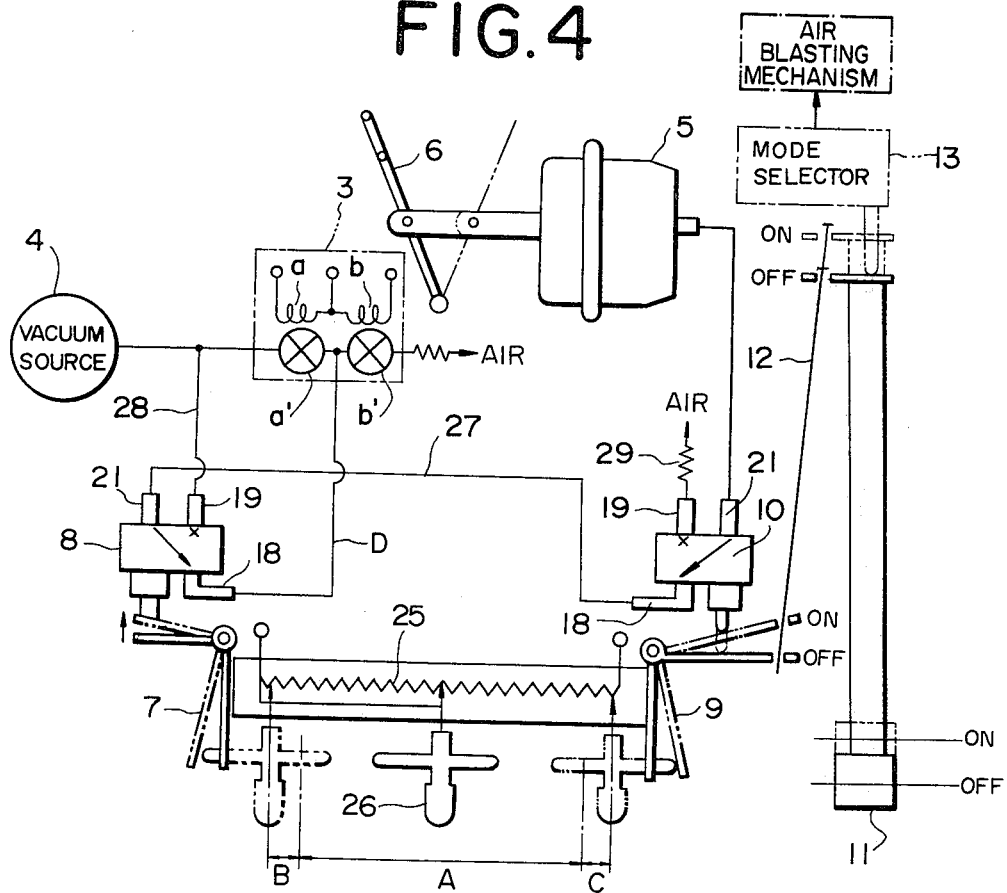
FIG. 4 is a circuit diagram of a second preferred embodiment according to the present invention.

FIG. 4 shows a second preferred embodiment of the present invention. In this embodiment, a defrost mode selecting means is directly connected to an emergency vacuum circuit fixing means of the air conditioning system. The air conditioning system shown in FIG. 4 is different from that shown in FIG. 2 in the following respects. The controlled-vacuum output from the double solenoid vacuum valve 3 passes through a three-way vacuum switch 8 and another three-way vacuum switch 10 into the power vacuum servomechanism 5.

The power servomechanism 5 moves the air mix door 6 angularly by means of the rod extended therefrom between both maximum and minimum stroke positions, the maximum stroke position indicating the air mix door 6 fully open to pass all of the intake air through the heating element and the minimum stroke position indicating the air mix door 6 fully closed to pass none of the intake cooled air through the heating element, according to the degree of air pressure received from both three-way vacuum switches 8 and 10.

On the other hand, the three-way vacuum switch 8 is connected to a vacuum supply conduit 28 directly extended from the vacuum source 4 in parallel with an output conduit D of double solenoid vacuum valve 3 so as to perform switching the connection of the vacuum power servomechanism 5 from the output conduit D of the double solenoid vacuum valve 3 to the vacuum supply circuit 28. An L-shaped link 7 is located near a switching rod of the three-way vacuum switch 8 and another L-shaped link 9 is also located near a switching rod of the three-way vacuum switch 10. When the lever 26 is shifted up to the maximum cooling fixing area B so as to approach and push the link 7, the link 7 turns upward to push the switching rod of the three-way vacuum switch 8. In addition, when the lever 26 is shifted up to the maximum heating fixing area C so as to approach and push the link 9, the link 9 turns upward to push the switching rod of the three-way vacuum switch 10. It will be noted that at this time the link 9 is not engaged with the tie-rod 12 so that the tie-rod 12 cannot be pushed upward. When the lever 26 is in the automatic temperature adjustment area A of the variable resistor 25, these two three-way vacuum switches 8 and 10 connect the output conduit D of the double solenoid vacuum valve 3 to a main conduit 27 as shown by an arrow-marked solid line within the three-way vacuum switch 8 in FIG. 4 and connect the main circuit 27 to the input portion of the vacuum power servomechanism 5 as shown by an arrow-marked solid line within the three-way vacuum switch 10 in FIG. 4, respectively. Therefore, the vacuum output automatically controlled by the double solenoid valve 3 extends toward the vacuum power servomechanism 5 through the passage described above in a normal operating state. However, when some trouble occurs in the air conditioning system, the passage described above is interrupted so that the vacuum power cannot be conveyed.

In this case, a user can shift the lever 26 to the leftmost or right-most end to make up an emergency temperature fixing vacuum circuit, so that the air conditioning system can be fixed in the maximum cooling or heating operation.

As shown in FIG. 4, the three-way vacuum switch 10 is operated so as to make up an emergency temperature fixing vacuum circuit for fixing the vacuum power servomechanism 5 in the maximum heating position by the shift of the lever 26 up to the right-most end or by the operation of the defrost selection switch 11 in the defrost setting.

Figure 5:
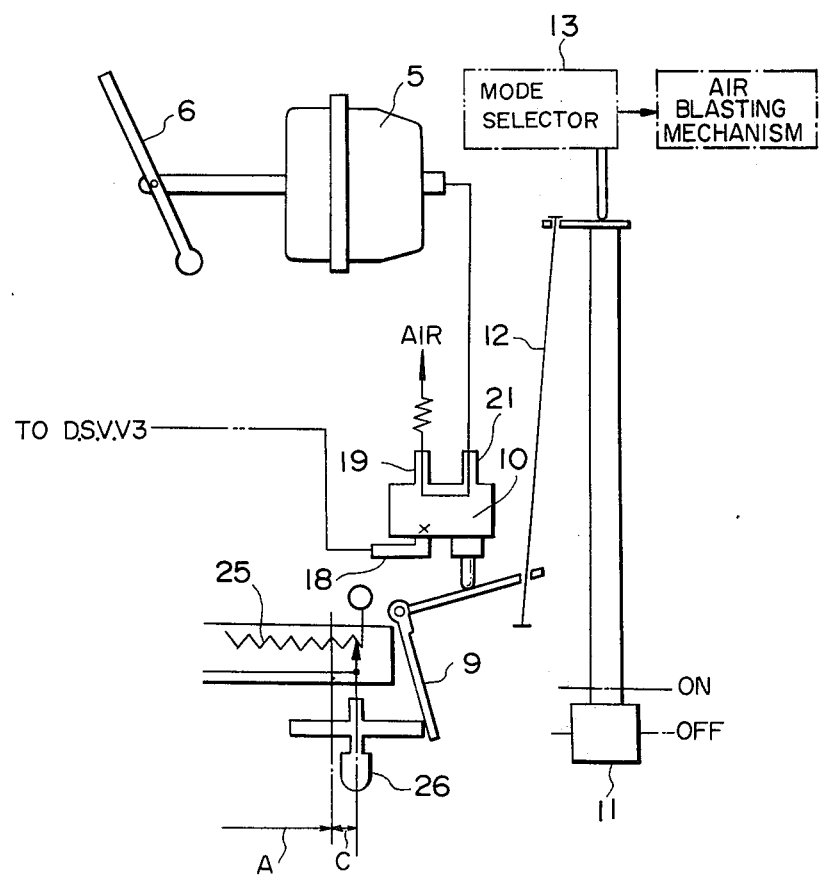
FIG. 5 is a circuit diagram partly showing an emergency vacuum circuit of an air conditioning system when a vacuum switch is operated when trouble occurs at an electronic temperature control circuit.
Figure 6:
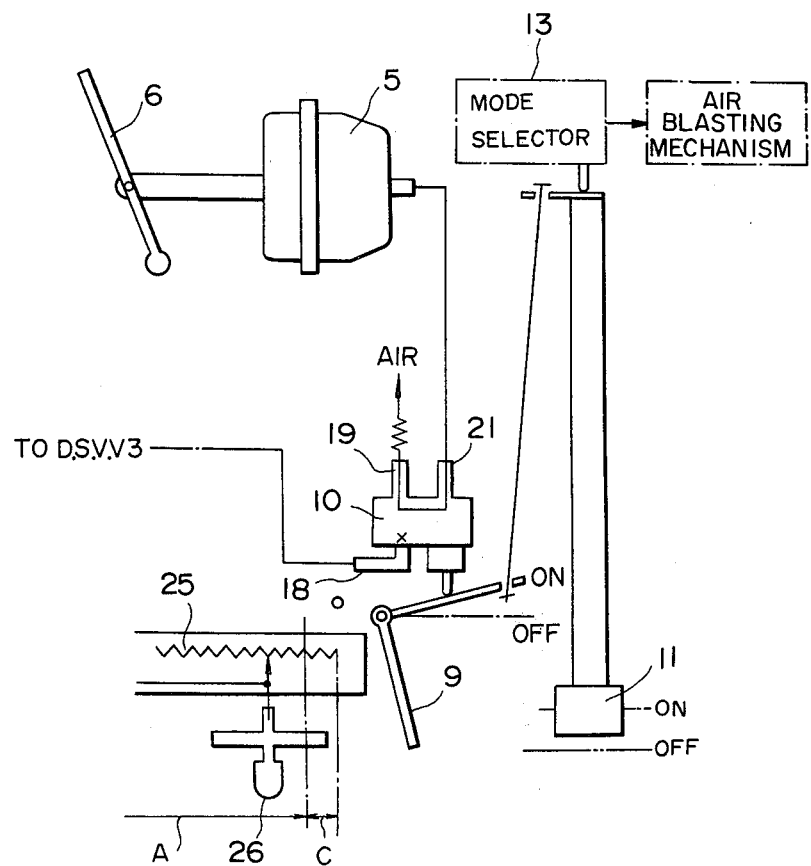
FIG. 6 is a circuit diagram partly showing an emergency vacuum circuit of an air conditioning system when a vacuum switch is operated by setting the system to a defrost operation.

FIGS. 5 and 6 illustrate operating states of the three-way vacuum switch 10 when each of the above-described operations is performed.

In FIG. 5, the lever 26 is shifted to the maximum heating fixing area C of the variable resistor 25 so as to engage with one bar of the L-shaped link 9 to turn another bar of the link 9 upward. At this time, the bar of the link 9 depresses the switching rod so as to switch the connection of the vacuum power servomechanism 5 from the main conduit 27 to the air opening conduit denoted by AIR in FIG. 5. Therefore, the vacuum power servomechanism 5 is displaced and fixed in the maximum heating position. In this case, the defrost mode selection push-button switch 11 makes no contribution to the operation of the link 9 because the link 9 moves only by the shift of the lever 26. In other words, the tie-rod 12 does not interlock with the link 9 at this time. The maximum heating operation continues with this mode maintained since the defrost mode switch 11 does not move in this mode.

In FIG. 6 showing the operation of the three-way vacuum switch 10 in the defrost setting operation, when the defrost mode selection push-button switch 11 is placed in the "ON" position, the tie-rod 12 attached thereto pulls upward on the end of a bar of the L-shaped link 9. A blade portion of the bar in the link 9 pushes upward the switching rod of the three-way vacuum switch 10 to open the vacuum power servomechanism 5 to the air. The vacuum power servomechanism 5 is displaced to fix the air mix door in the maximum heating position. At this time, the defrost mode selection push-button switch 11 activates the mode selector 13 including means such as a vacuum selector to operate the air blasting mechanism so as to maximize the air blowing rate through the fan and drive the air conditioning system in the defrost state i.e., the intake door is opened to admit fresh air from outside the vehicle into the air conditioning duct, and the defroster door is opened with the other doors closed.

As described hereinbefore, according to the present invention, a single operation of the defrost mode selection push-button switch permits the air blasting mechanism to be set into the defrost mode, as well as the air mix door to be fixed in the maximum heating position by a mere mechanical connection. Consequently, the defrosting can be completed in a very short time.

Furthermore, when a power transmitting member interlocked with the defrost mode selection push-button switch is connected to a maximum heating fixing means of an emergency operation mechanism, the maximum heating fixing means can be used as one element of both an emergency temperature fixing vacuum circuit and a defrost setting mechanism, so that the construction of the air conditioning system can be simplified and the rate of failure can be reduced.

In addition, a switch of the same construction as the mode selection switch is disposed to engage with the link 7 in symmetry with the position of the mode selection push-button switch 11 shown in FIG. 4, so that a single pushing on the button switch of this type enables the three-way vacuum switch to be changed immediately into the maximum cooling mode when trouble in an electric circuit of the air conditioning system occurs.

It will be understood by those skilled in the art that the above and other similar modifications may be made in the preferred embodiments described above without departing from the spirit and scope of the present invention, which is to be defined by the appended claims.

What is claimed is:

1. An air conditioning system for an automotive vehicle compartment, which comprises:
   (a) a vacuum source;
   (b) a vacuum power servomechanism for performing proportional control over an opening angle of an air mix door with respect to a position to fully cool air passing through the air conditioning system according to a vacuum pressure value input thereto;
   (c) a vacuum pressure controlling means connected to said vacuum source for controlling the vacuum pressure value input to said servomotor within a range from atmospheric pressure to a vacuum pressure sent from said vacuum source according to a vacuum control signal input from a temperature responsive electric control circuit;
   (d) a first emergency vacuum circuit fixing means connected between said vacuum pressure controlling means and said vacuum power servomechanism for selectively switching said vacuum power servomechanism to be opened to the air;
   (e) a mode selector for operating an air blasting mechanism; and
   (f) a defrost mode selecting means operatively connected to said mode selector and to said first emergency vacuum circuit fixing means.

2. An air conditioning system for an automotive vehicle compartment as set forth in claim 1, which further comprises:
   (g) a vacuum supply conduit directly connected to said vacuum source;
   (h) a second emergency vacuum circuit fixing means connected between said vacuum supply conduit, the output portion of said vacuum pressure controlling means, and a main conduit for selectively connecting said vacuum supply conduit to the main conduit;
   (i) a lever interlocked with a contact blade forming a variable resistor of said vacuum pressure controlling means to determine a set temperature of the air conditioning system;
   (j) a first L-shaped link located between a switching member of said second emergency vacuum circuit fixing means and one end of the variable resistor; and
   (k) a second L-shaped link located between a switching member of said first emergency vacuum circuit fixing means and the other end of the variable resistor and engaged with said defrost mode selecting means only when said defrost mode selecting means is operated.

3. An air conditioning system for an automotive vehicle compartment as set forth in claim 2, wherein said first emergency vacuum circuit fixing means is a three-way vacuum switch and said defrost mode selecting means comprises:
   (l) a push-button switch for activating said mode selector when pushed; and
   (m) a driving power transmitting member interlocked with said push-button switch and operatively connected to one bar of said second L-shaped link.

4. An air conditioning system for an automotive vehicle compartment as set forth in claim 2, including a push-button switch and driving power transmitting member engaged with one bar of said first L-shaped link.

5. An air conditioning system for an automotive vehicle compartment as set forth in claim 3, wherein said push-button switch and driving power transmitting member can be engaged with one bar of said first L-shaped link.

6. A defrost mode fixing means for a vehicle air conditioning system including:
   (a) a vacuum source (4);
   (b) a double solenoid vacuum device (3) having two valves, one valve linked with said vacuum source which opens to admit a vacuum from said vacuum source thereto when the corresponding solenoid is energized in response to a temperature adjustment electronic control circuit, and the other valve which opens to atmospheric pressure when the corresponding solenoid is energized in response to said temperature adjustment electronc control circuit, said double solenoid vacuum device producing a controlled vacuum pressure according to the opening rates of said two valves;
   (c) a vacuum power servomechanism (5) having a rod extended therefrom whose stroke position depends on the controlled vacuum pressure from said double solenoid vacuum device, said rod extending at a first extreme position when the double solenoid vacuum device is open to atmospheric pressure;
   (d) an air mix door (6), operatively connected to the rod extended from said vacuum power servomechanism for angular movement corresponding the stroke position of the rod for adjusting the rate of air passing through an air heating element of an air conditioning duct to provide tempered air to a vehicle compartment, said air mix door being positioned for maximum air heating when the rod is positioned at said first extreme position; and (e) a mode selector (13) having an actuating member for operating an air blasting mechanism to direct air into said vehicle compartment in a defrost mode of operation, said defrost mode fixing means comprising:

(a) a first three-way switching member (10), connected between said double solenoid vacuum device and said vacuum power servomechanism, and connected to atmospheric pressure, said switching member switching from a first position communicating said controlled vacuum pressure to said power servomechanism to a second position communicating atmospheric pressure to said power servomechanism in response to actuation of a control member; and (b) a manually operable switching member (11, 12, 31, and 32) for simultaneously actuating said actuating member and said control member, whereby, upon actuation of said switching member, said defrost mode is effected simultaneously with maximum air heating.

7. A defrost mode fixing means for a vehicle air conditioning system as set forth in claim 6, wherein said double solenoid vacuum device has an output conduit and said first three-way switching member is a three-way vacuum switch comprising:

(a) a housing having a first passage communicating with said vacuum power servomechanism, a second passage communicating with atmospheric pressure, and a third passage communicating with the output conduit of said double solenoid vacuum device;

(b) a first elastic member provided within said housing and connected to said control member for biasing said control member away from said housing for biasing said switching member toward said first position;

(c) a second elastic member connected at one end thereof with said control member; and (d) a movable contact, provided within said housing and having an arm, one end of which is fixed on said housing and the other end of which is linked with the other end of said second elastic member, said arm closing said third passage so that the air from said second passage is conveyed to said first passage when the control member is pushed into said housing, thereby switching said three-way switching member into said second position.

8. A defrost mode fixing means for a vehicle air conditioning system as set forth in claim 6, wherein said manually operable switching member comprises:

(a) a manually operable rod for moving the actuating member of said mode selector;

(b) a first blade, located near the control member of said first three-way switching member, having a pin at one end thereof, which turns with said pin as a center so as to push the control member when said manually operable rod is pushed; and (c) a tie-rod linked between said manually operable rod and said first blade for transmitting the force generated to said blade only when said manually operable rod is pushed.

9. A defrost mode fixing means for a vehicle air conditioning system as set forth in claim 8, which further comprises:

(a) a second three-way switching member (8) connected between said double solenoid vacuum device and said first three-way switching member, and connected to said vacuum source, said second three-way switching member switching from a first position communicating said controlled vacuum pressure to said first three-way switching member to a second position communicating said vacuum source to said first three-way switching member in response to actuation of a control element;

(b) a lever (26) interlocked with a contact blade forming a variable resistor, the variable resistor connected to the temperature adjustment electronic control circuit for determining a set temperature of the air conditioning system according to the set position of the contact blade;

(c) a second blade forming a first L-shaped link with said first blade, located near one end of the variable resistor, which turns with said pin as a center, so that said first blade pushes the control member of said first three-way switching member when pushed by said lever; and (d) a second L-shaped link having two blades and another pin located between the control element of said second three-way switching member and another end of the variable resistor, which pushes the control element of said second three-way switching member when pushed by said lever.

10. A defrost mode fixing means for a vehicle air conditioning system as set forth in claim 9, wherein said manually operable rod does not push the actuating member of said mode selector when said lever pushes the second blade forming the first L-shaped link.

11. A defrost mode fixing means for a vehicle air conditioning system as set forth in claim 9, wherein said second three-way switching member is a three-way vacuum switch having the same construction as said first three-way switching member.

* * * * *